United States Patent [19]

Cooke

[11] 4,142,905
[45] Mar. 6, 1979

[54] WATERLESS INK FOR NON-IMPACT JET PRINTERS

[75] Inventor: Theodore M. Cooke, Southfield, Mich.

[73] Assignee: Burroughs Corporation, Detroit, Mich.

[21] Appl. No.: 832,039

[22] Filed: Sep. 9, 1977

[51] Int. Cl.² ............................................. C09D 11/02
[52] U.S. Cl. ..................................................... 106/22
[58] Field of Search ..................... 106/22; 252/74, 75

[56] References Cited

U.S. PATENT DOCUMENTS

| 3,705,043 | 12/1972 | Zabiak | 106/22 |
| 3,994,736 | 11/1976 | Hertz et al. | 106/22 |

Primary Examiner—Hosea E. Taylor
Assistant Examiner—Amelia B. Yarbrough
Attorney, Agent, or Firm—Lynn L. Augspurger; Kevin R. Peterson; Edward J. Feeney

[57] ABSTRACT

Disclosed is a new method of using an ink in an ink jet printer and the ink utilized thereby. It has been found that ethylene glycol is a suitable vehicle, provided an inorganic salt dissolved in the glycol to provide a required level of electrical conductivity is utilized, and in which should be dissolved dyes for coloration.

6 Claims, No Drawings

WATERLESS INK FOR NON-IMPACT JET PRINTERS

BACKGROUND OF THE DISCLOSURE

In existing ink jet printers it is common to utilize a dye in a mixed glycol and water solution. The water is utilized to provide a level of electrical conductivity and to permit the dye to go into solution in the vehicle.

This requires the utilization of a water refill container and the attendant responsibilities of the operator to keep the water refill reservoir replenished with a suitable water supply. This is undesirable and expensive but until the discovery of the ink that we formulated below and described as the preferred embodiment of our invention we had found no successful substitute.

SUMMARY OF THE INVENTION

It is the object of this invention to utilize a new ink formulation without water in an ink jet non-impact printer thereby eliminating the need for replenishment of the water reservoir and the water itself.

In accordance with our invention we have provided a new ink formulation and a new use for the ink so formulated. The ink formulation has a lower molecular weight diol, which is the preferred ethylene glycol, in which is dissolved an inorganic salt electrolyte and a dye suitable for coloration.

DETAILED DESCRIPTION OF THE INVENTION

For the ink, I have formulated an ink which is quite stable with respect to dye evaporation and forms suitable droplets when subjected to heat, sonic vibration and pressure.

The advantages of the waterless ink are many. It allows the continuous operation of the printer without a volume loss due to evaporation; and it obviates the expensive water add reservoir system previously utilized. It offers ink stability in various environmental conditions and it allows printing on a great variety of paper stocks including coated paper stocks where water based inks are not acceptable.

In accordance with my preferred formula I have provided an ink consisting of:
  ethylene glycol: 89-93% by weight
  sodium nitrite: 3-6% by weight
  Nigrosine Black Dye, water soluble: 3-6% by weight Nigrosine Black Dye is a jet concentrate water soluble type dye furnished by GAF Corporation. Substitutes can include a Chrom Chelated dye named Orasol Black RN (CiBA - Geigy) or Violet RN from CiBA — Geigy which dyes are soluble in the vehicle and do not interfere substantially with the electrical conductivity.

Sodium nitrite is the preferred electrolyte. Other organic salts known to be electrolytes can be substituted. Preferred substitutes for sodium nitrite would be sodium chloride or sodium nitrate. The vehicle is a glycol (diol). It is preferred that the diol be chosen from the group consisting of ethylene glycol, propylene glycol, the lower weight polyoxyethylene glycols or one of the named glycols, such as the polyglycols Polyglycol E-300 to Polyglycol E-600 from Dow Chemical, or other glycols having a molecular weight below 500, or mixtures thereof.

The reservoir in which the ink is deposited is provided with a small resistance heater and thermostat maintaining the ink reservoir at a temperature between 35° C. and 70° C. As the inks surface tension varies with the change of the ingredients the temperature and other parameters of the environmental conditions for the reservoir are adjusted. The amount of electrolyte is varied to maintain sufficient electrical conductivity of the ink to have proper operating conditions. As the electrical conductivity required varies from printer to printer, an exact ratio of constituents has not been determined, but is subject to deviation within the stated range.

My preferred formula as to ratio by weight is:
  ethylene glycol, or substitute: 91% by weight
  sodium nitrite, or substitute: 5% by weight
  Nigrosine Black Dye, or substitute: 4% by weight This formula has a liquid phase at operating temperature of known Ink Jet Printers.

After having read the aforementioned description of my invention the various modifications and substitutions will occur to those skilled in the art both now and in the future. The scope of my invention is outlined in the following claims.

In the waterless Ink Jet Printer the ink is subjected to pulsation through an orifice which breaks it into droplets which droplets are then subjected to an electrical field which now propels them toward the printing surface.

I should here note that the dyes here are all current commercial formulations sold by the named companies in the United States. It is believed that the GAF Nigrosine die is a mixture of the sulfonated salts of triphenazineoxazines and phenazineazines in solution. The Orasol Dyes are kept by Ciba Geigy as commercial secrets. The dye is believed to be an organic complex molecule ionicall bonded to a chromium ion.

It will be appreciated that various equivalent substitutions will occur to those skilled in the art after reviewing this disclosure, such substitutions for the specific examples are contemplated in the scope of my invention as defined by the appended claims.

I claim:

1. A waterless ink for a non-impact jet printer consisting essentially of:
  89% to 93% by weight of a low molecular weight glycol having a liquid phase within the range of 35° C. to 70° C. and at operating temperatures of the non-impact jet printer, and
  between 3-6% by weight of an inorganic salt electrolyte and
  between 3-6% by weight of a dye which is soluble in the glycol.

2. An ink according to claim 1 when the glycol is chosen from the group consisting of separately or as mixtures, ethylene glycol, propylene glycol, low molecular weight polyoxyethylene glycol, and polyglycols having molecular weight below 500.

3. An ink according to claim 1 wherein the electrolyte is chosen from the group consisting of sodium nitrite, sodium chloride and sodium nitrate or mixtures thereof.

4. The ink according to claim 1 wherein the glycol is in the formulation as a percentage by weight of between 89% and 93% by weight and the electrolyte is between 4% and 6% by weight.

5. The ink according to claim 1 wherein the glycol is formulated at 91% by weight, the electrolyte at 5% by weight and the dye at 4% by weight.

6. The ink according to claim 1 wherein the ink consists essentially of ethylene glycol at 91% by weight, sodium nitrite at 5% by weight and a diol soluble dye at 4% by weight.

* * * * *